(12) United States Patent
Winter et al.

(10) Patent No.: US 11,081,883 B2
(45) Date of Patent: Aug. 3, 2021

(54) DEVICE FOR EARTH FAULT CURRENT COMPENSATION IN POWER NETWORKS

(71) Applicant: Swedish Neutral AB, Kungsängen (SE)

(72) Inventors: Klaus Winter, Kungsängen (SE); Andreas Winter, Stockholm (SE); Håkan Winter, Lidingö (SE)

(73) Assignee: Swedish Neutral AB, Kungsängen (SE)

( * ) Notice: Subject to any disclaimer, the term of this patent is extended or adjusted under 35 U.S.C. 154(b) by 26 days.

(21) Appl. No.: 16/615,970

(22) PCT Filed: May 18, 2018

(86) PCT No.: PCT/SE2018/050515
§ 371 (c)(1),
(2) Date: Nov. 22, 2019

(87) PCT Pub. No.: WO2018/217154
PCT Pub. Date: Nov. 29, 2018

(65) Prior Publication Data
US 2020/0099220 A1 Mar. 26, 2020

(30) Foreign Application Priority Data

May 24, 2017 (SE) .................................. 1750651-0

(51) Int. Cl.
*H02H 9/08* (2006.01)
(52) U.S. Cl.
CPC .................................... *H02H 9/08* (2013.01)
(58) Field of Classification Search
CPC .................................. H02H 9/08; H02H 3/331
See application file for complete search history.

(56) References Cited

U.S. PATENT DOCUMENTS

2021/0126450 A1* 4/2021 Zeng ...................... G01R 31/52

FOREIGN PATENT DOCUMENTS

| CN | 2438257 Y | * 7/2001 | ............... H02H 9/08 |
| CN | 104662761 A | 5/2015 | |

(Continued)

OTHER PUBLICATIONS

International Search Report and Written Opinion for corresponding Patent Application No. PCT/SE2018/050515 dated Sep. 14, 2018.

(Continued)

*Primary Examiner* — Harry R Behm
(74) *Attorney, Agent, or Firm* — Renner, Otto, Boisselle & Sklar, LLP

(57) ABSTRACT

A device comprising at least two controllable reactance elements (1) arranged to compensate a single phase-to-earth fault current in a power network with a power transformer (3). The at least two controllable reactance elements (1) are each connected with one side to two different voltages of a three phase voltage source which is synchronous with the power network, and that the reactance elements with their other side are jointly connected to the neutral (N) of the power network or its equivalent. The reactance elements are individually controllable by a control unit (2) designed to control the neutral voltage of the power transformer (3) or its equivalent with respect to amplitude and phase in relation to the power transformer's own voltage system. A method in relation to the device is also disclosed.

10 Claims, 4 Drawing Sheets

(56) References Cited

FOREIGN PATENT DOCUMENTS

| | | | |
|---|---|---|---|
| DE | 19525417 A1 * | 1/1997 | ............... H02H 9/08 |
| EP | 0 164 321 A1 | 12/1985 | |
| EP | 1 855 366 A2 | 11/2007 | |
| SE | 437 096 B | 2/1985 | |
| SU | 503368 A * | 4/1973 | ............... H02J 13/00 |
| WO | 86/03350 A1 | 6/1986 | |
| WO | 2006/042482 A2 | 4/2006 | |
| WO | 2014/021773 A1 | 2/2014 | |

OTHER PUBLICATIONS

Original Office Action and Search Report for corresponding Chinese Application No. 201880034355.9, dated Apr. 9, 2021.

* cited by examiner

DEVICE FOR EARTH FAULT CURRENT COMPENSATION IN POWER NETWORKS

FIELD OF THE INVENTION

The invention concerns a device for earth fault current compensation, comprising two or more fast adjustable reactance elements, arranged to compensate for an earth fault current in a power network with a power transformer according to claim 1. Furthermore the invention concerns a method to create a neutral voltage in a power network with a power transformer according to claim 7.

BACKGROUND OF THE INVENTION AND PRIOR ART

Today, transfer of electric power is mainly accomplished by means of cyclo-symmetrical three phase voltage systems. To fulfil the basic demands of the system—production and consumption of power must be in balance at all times. In order to facilitate this requirement large national transmission networks have been created, where all producers and consumers of electric power are interconnected. The connection of these national grids to transnational networks provides further advantages with respect to the basic balance requirement. One such transnational network for example is the Scandinavian NORDEL network.

To reduce the losses in the transmission networks, the long distance transport of energy is accomplished at high voltage, preferably 400 kV. The energy output to the consumers from the transmission network is carried out via grid exit transformers, which in turn, supply a limited geographical area. The distribution is mainly effected at 10-30 kV voltage levels. Large industry customers are connected directly to the distribution network, while smaller consumers and households are supplied over yet another transformation to 400/230V.

Due to their meshed structure, transmission networks have relatively high availability. Distribution networks, however, normally have radial structures, and therefore constitute a weak link in the overall power transmission system. Faults on individual distribution lines may lead to disconnection of large groups of consumers. Distribution line fault protection therefor must not only ensure highest possible public safety and fire protection but at the same time also keep the distribution networks available. At a first glance these two aims look difficult to combine.

But, in this context it is important to understand that the majority of the line faults are caused by single phase-to-earth insulation break downs—so called earth faults—while the energy transfer takes place between the phases. Earth does not take part in the transfer of energy. From a protection point of view it would be desirable to treat earth faults separately, and if possible choke the fault current in a systematic way down to levels where an immediate line disconnection can be avoided.

The most successful protection concept based on this understanding was developed in 1917 by Waldemar Petersen. By connecting the neutral of the power system to earth over an adjustable inductance, which is tuned to the grid capacitive leakage, Petersen could reduce the earth fault current by a factor of ten up to fifty. This reduction is usually enough to ensure the self-extinction of single phase flashover faults, which is the most frequent fault type on overhead lines.

Today, Petersen's resonance earthing dominates in the Scandinavian and other European distribution networks. Due to the self-extinction of flashover faults, these networks have an overall availability that is superior to other comparable distribution networks, employing other concepts for system earthing.

In the ongoing conversion of the distribution networks from overhead line to underground cable networks the capacitive leakage currents increase dramatically by a factor 30 to 50 due to the much higher specific capacitance of cables. This affects Petersen's resonance earthing twofold: On one hand the self-quenching effect on flashover faults in the remaining overhead grid decreases successively and finally stops working due to increasing residual fault currents which are not compensated by Petersen's "arc suppression coil". On the other hand the self-quenching effect does not work at all in cable grids, due to the short distance between live conductor and the earthed cable shield.

The problem was identified and finally solved in the beginning of the nineties. New, computer based technology for residual current compensation (RCC) was developed to be used as a complement to the arc suppression coil of Waldemar Petersen. The new technology made resonance earthing again the superior concept for both overhead and cable networks. Today resonance earthing with RCC technology is used worldwide on voltage levels from 6 kV to 110 kV, now even in grids which previously employed other earthing concepts.

In contrast to the traditional arc suppression coil, which simply increases the source impedance in the earth fault circuit, the RCC eliminates the driving voltage in that circuit by superimposing an equal but opposite voltage. This is not just a trivial task, since the exact driving voltage is unknown at the beginning of an earth fault.

According to Thevenin's theorem the fault current is determined by the driving voltage at the fault side and the impedance of the fault in series with the source impedance. Conversely, to eliminate the fault current completely, the driving voltage at the fault side must be eliminated.

The driving voltage at the fault side is made up by the phase-to-earth voltage of the supplying transformer (known, respectively measurable at the substation), plus the load current dependent voltage drop between the supplying transformer and the actual fault side, which could be far out in the grid (unknown).

Determining the latter became possible by the development of a new computer based algorithm, which was first published in the beginning of the nineties (Winter, K. "Swedish Distribution Networks—A New Methode for Earthfault Protection in Cable and Overhead Systems", 5th International Conference on Power System Protection, IEE conference publication no 368, York/UK 1993).

The remaining problem, to generate a voltage, possible to control with respect to amplitude and phase in relation to the supplying transformer was solved first by an arrangement of two phase shifting transformers. (Swedish patent application no SE437096, 1984). As the mechanical control of a phase shifting transformer is relatively slow, this solution was later replaced by power electronic (pulse-width modulating inverters) Today reference installations for the combined ASC/RCC with inverter technology are in operation worldwide in many power grids from 6 kV up to 110 kV.

The necessary power for the RCC inverter is dependent on voltage level and grid size in terms of capacitive leakage current and damping factor. Large cable grids in the urban areas of the world may exceed 1000 A capacitive leakage current with an uncompensated residual fault current in the order of 100 A or more. Expensive inverters, larger than 1 MVA, are required to compensate these huge currents.

The present invention propose a novel, more reliable and more cost efficient arrangement for the compensation of the residual earth fault current.

SUMMARY OF THE INVENTION

The objective of the invention is to solve the above problems and offer a simpler and more robust solution for earth fault current compensation. A further objective is to compensate the earth fault current completely and thereby improve safety. Yet another objective is to improve the reliability of the compensation device and thereby the reliability of the whole power transmission. Finally, to lower the costs for the earth fault current compensation is also an objective of the invention.

These objectives are achieved by means of a device, defined in the preamble of claim 1, which is characterized by at least two controllable reactance elements, each connected with one side to a phase of a three phase power source, which is synchronous with the main power system, and where the other side of the reactance elements is jointly connected to the neutral of the main power system or its equivalent. In this way the neutral voltage of the main power system and its phase can be controlled by the size of the reactance elements, which in turn are controlled by a control device for the neutral voltage in order to eliminate the driving voltage for an earth fault current.

The advantage of the invention is improved safety by a very fast elimination of voltage injection and earth fault current into the fault side. No immediate line disconnection is necessary for this. Therefor the new invention improves not only public safety and fire protection but also supply quality. The device is simple to manufacture and offers a low cost upgrade for existing arc suppression coils.

Furthermore the device is suitable for different types of AC power networks like, two, three or other multi-phase systems.

According to another embodiment of the invention the mentioned control device is connected to the reactance elements, for online control of phase-to-ground voltages in order to monitor grid insulation online and allow the early detection of latent insulation issues like for instance bad surge arresters etc.

According to a further embodiment of the invention, the control device will decide which phases to connect to the two reactance elements.

According to another embodiment of the invention, the control device will control the size of the reactance elements until the conditions for the full earth fault current compensation are fulfilled.

The device according to the invention may thereby be used together with known control and measurement units for residual current compensation (RCC).

According to yet another embodiment of the invention the device is arranged to work in parallel with an existing Petersen coil in order to just eliminate the residual fault current which is not compensated by the Petersen coil.

But in this arrangement the device can also be used just to increase the power of the Petersen coil.

These purposes are achieved by means of a method, defined in the preamble of claim 7, which is characterized by the use of at least two adjustable reactance elements, each connected with one side to a phase of a three phase power source, which is synchronous with the main power system and where the other side of the reactance elements is jointly connected to the neutral of the main power system or its equivalent. In this way the neutral voltage of the main power system and its phase can be controlled by the size of the reactance elements, which in turn are controlled by a device for the control of the neutral voltage in order to eliminate the driving voltage for an earth fault current.

The method according to the invention improves the reliability of existing compensation devices and thereby also improves the availability of the power supply.

The purpose is achieved by a method to generate a neutral voltage in a power network which is supplied from a power transformer, characterized by an arrangement including at least two controllable reactance elements, each connected with one side to a phase of a three phase power source, which is synchronous with the main power system and where the other side of the reactance elements is jointly connected to the neutral of the main power system or its equivalent, while a control device is connected to the reactance elements in order to control the neutral voltage of the main system, and where:

the control unit adjusts the neutral voltage with respect to amplitude and phase angle in relation to the voltages of the main power transformer the control unit decides which reactance elements are connected to the neutral of the main power system the control unit adjusts the size of the reactance elements until the conditions for the full compensation of an earth fault current are met.

According to one embodiment of the method only two reactance elements are used, where the control unit first decides to which of the two phases of a synchronous three phase AC power source the elements are connected.

According to another embodiment of the method three reactance elements are used to speed up the fault interception by direct control of the concerned reactance elements, while the third element is left off.

The purpose can be achieved likewise by use of one of the arrangements of the method in parallel to an existing Petersen coil, just to take care of the residual fault current which is not compensated by the Petersen coil.

DETAILED DESCRIPTION OF THE INVENTION

Figure 1:
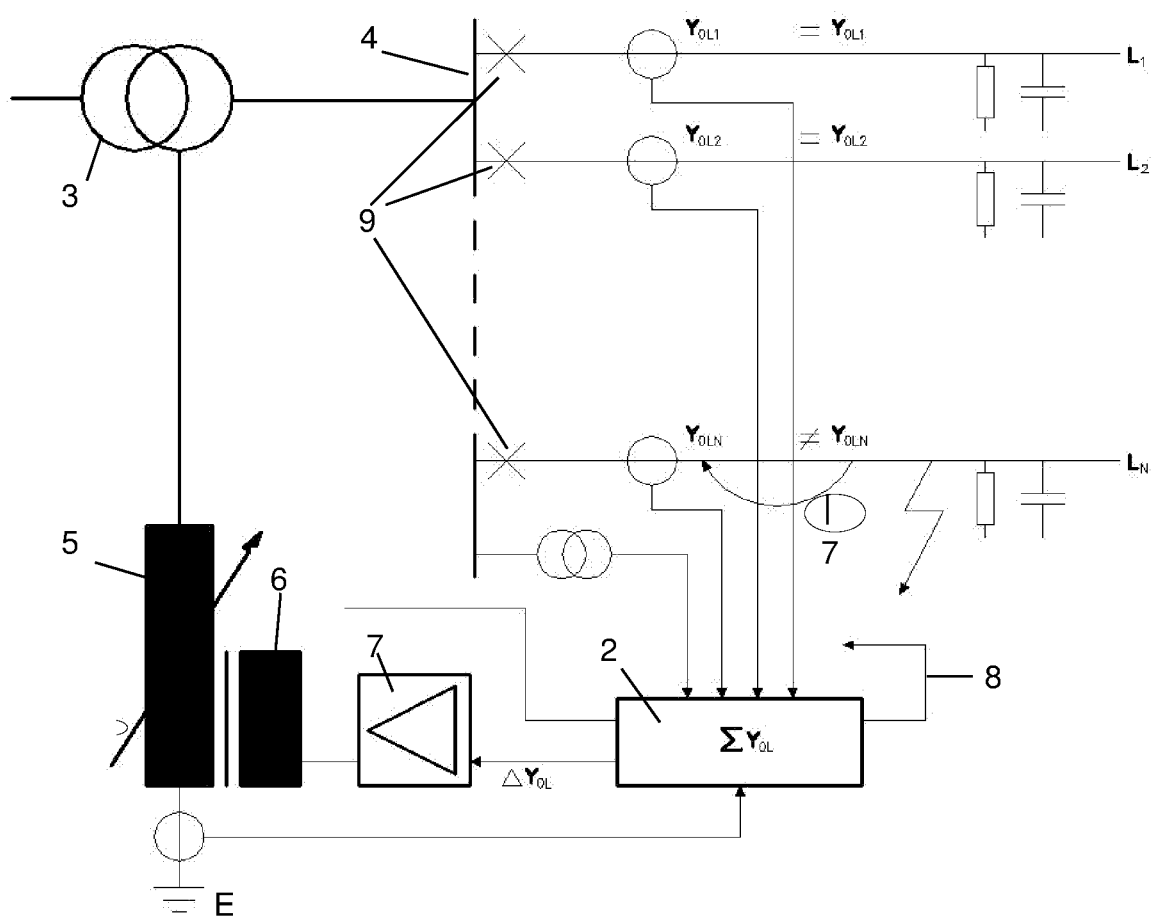
FIG. 1 shows a single line diagram of a distribution network with a known arrangement for the compensation of an earth fault current
Figure 2:
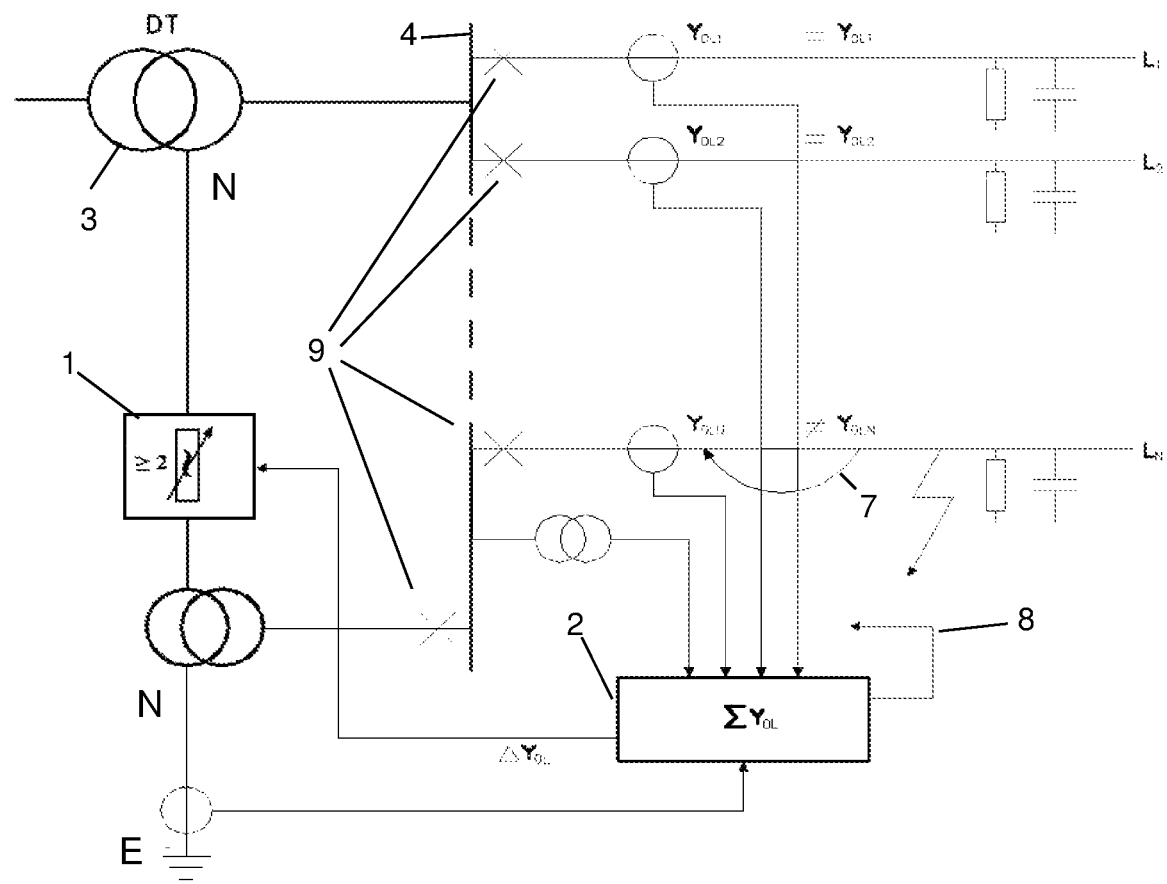
FIG. 2 shows the same distribution network with an arrangement for the compensation of an earth fault current according to the invention.

FIGS. 1 and 2 show a distribution network with a control and measurement unit 2 for the detection of an earth fault and the control of a fault current compensation device. Furthermore the figures show a power transformer 3, a busbar 4 and a number of outgoing feeders $L_1, L_2 \ldots L_N$, each with a line breaker 9 at the busbar 4.

Electric power transmission is generally effected by means of cyclo symmetrical three phase systems. However, even single and two phase systems (railway) exist. The common ground is that transfer of payload (to the consumers) is driven exclusively by the voltages between the phases. If an error occurs in form of an insulation break down between these phases, the feeder in question and all the consumers behind are disconnected by the line breaker 9.

However, the majority of electrical faults occur between one of the phases and earth (so called earth faults). Thereby the entire system is shifted in relation to earth. Nevertheless, the voltages between the phases (which are driving the payload) are not affected.

The fault current to earth at the actual fault side is determined by other currents to earth (mainly capacitive but also resistive leakage currents) in the galvanically interconnected network. The sum of all these currents to earth, including the fault current, is always zero (Kirchhoff's current law). From this follows the conclusion: If one wants to bring the fault current to zero, you must make sure all other currents to earth sum up to zero.

The purpose of the compensation devices in both FIGS. 1 and 2 is to create this balance by producing a corresponding current between the neutral of the network and earth.

FIG. 1 thereby shows a known device for this compensation, consisting of a Petersen coil 5 with an auxiliary power winding 6 for an inverter 7 to inject the residual fault current, which is not compensated by the Petersen coil. An option for back up tripping of the faulty feeder 8 in cause of a malfunction of the compensation device is also shown.

FIG. 2 shows an arrangement for compensation of the complete fault current by two reactance elements according to the invention.

The control and measurement device 2 continuously monitors the zero sequence admittance (Yo) on the outgoing feeders $L_{1-N}$ and in the earth connection of the compensation device. The actual values are stored in the memory of the device. Upon detection of an earth fault the measurement is repeated. Then the difference between the stored and last value is calculated feeder by feeder.

The fault is on the feeder which shows a difference (delta Yo) between the two values. The difference which also can be seen in the earth connection of the compensation device is used to control the setting of the compensation device. In FIG. 1 it is the known arrangement with an inverter, while in FIG. 2 two adjustable reactance elements according to the invention are used to achieve balance. In both cases a controllable voltage is created between the neutral of the network N and earth E.

When this neutral voltage corresponds to the driving voltage at the fault side, delta Yo and thereby the current in the fault becomes zero (Thevenins theorem).

Figure 3:
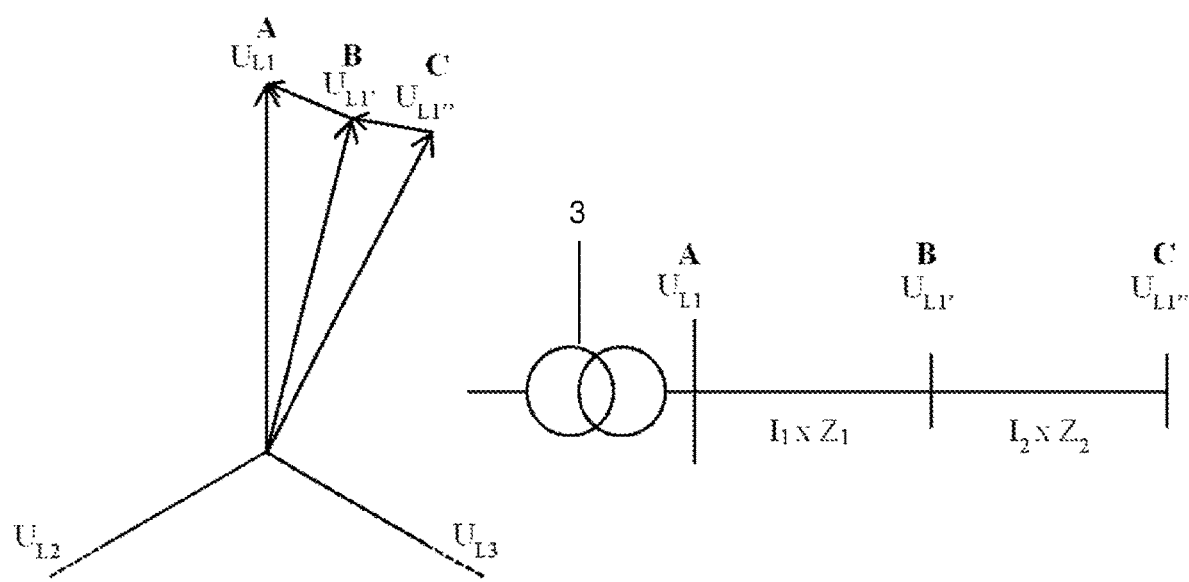
FIG. 3 shows the vector diagram for the driving voltage dependent on the location of the earth fault in the distribution network.

As FIG. 3 shows a controllable neutral voltage is required to inhibit the driving voltage at the fault side. The compensation device has to create this voltage, which must be adjustable in both amplitude and phase with respect to the voltage system of the supplying power transformer.

Figure 4A:
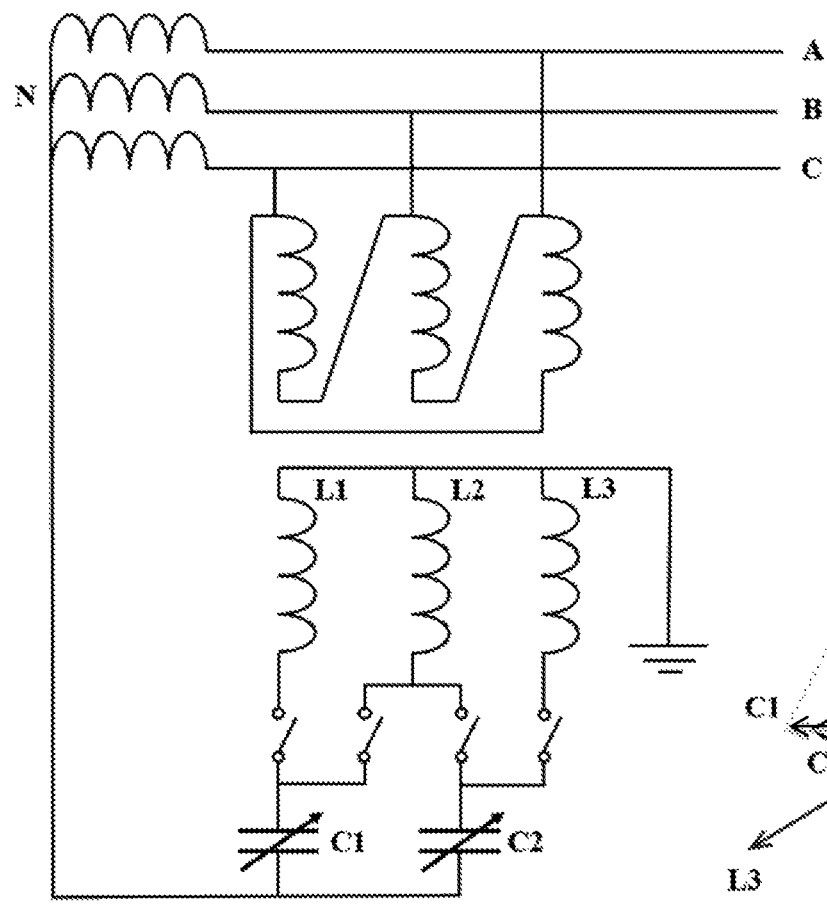
FIG. 4a shows the detailed circuit diagram for an arrangement according to the invention.

FIG. 4a shows a circuit diagram for the arrangement of two controllable reactance elements according to the invention. A reactance element is per definition a passive 2-pole, either capacitive or inductive. In the example in FIG. 4a the reactance elements are made up of two tuneable capacitor banks, already known and used as fast tuning range for different types of fixed Petersen coils.

The control unit first selects to which two phases the reactance elements have to be connected and then individually controls the size of the elements until the condition for full fault current compensation (delta Yo=0 mS) are fulfilled.

Figure 4B:
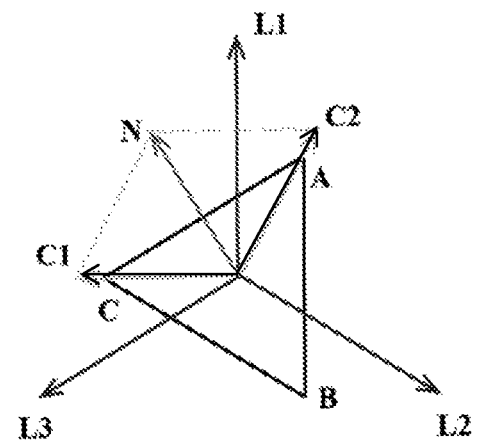
FIG. 4b shows the vector diagram for that arrangement.

FIG. 4b finally shows the vector diagram for the compensation arrangement of FIG. 4a. The delta connected primary winding of the source transformer induces on the wye-connected secondary side three cyclo symmetrical voltages with 120° phase shift. Together with the two adjustable reactance elements and the three possible permutations of two of these voltages it is possible to create a resulting voltage which can be varied 0-100% in amplitude and 120° in phase for each permutation, i.e. 360° in total.

The device can be used for the complete compensation of the earth fault current as well as in parallel to an existing Petersen coil just for the compensation of the residual fault current which is not compensated by the Petersen coil.

The invention is not limited to the above shown arrangement, but can be varied in many ways within the frame of the below following claims.

The invention claimed is:

1. A device comprising at least two controllable reactance elements arranged to compensate a single phase-to-earth fault current in a power network with a power transformer, wherein the at least two controllable reactance elements are each connected with one side to two different voltages of a three phase voltage source which is synchronous with the power network, and that the at least two controllable reactance elements with their other side are jointly connected to neutral of the power network, wherein the at least two controllable reactance elements are individually controllable by a control unit designed to control neutral voltage of the power transformer with respect to amplitude and phase in relation to the power transformer's own voltage system, wherein said controllable reactance elements are made up of two tuneable capacitor banks, and wherein the at least two reactance elements are individually controllable to control the neutral voltage to eliminate a drive voltage of an earth fault current.

2. The device according to claim 1 wherein said at least two controllable reactance elements comprise three reactance elements, one in each phase of the voltage source.

3. The device according to claim 1, wherein the control unit comprises a control and measurement unit connected to the at least two controllable reactance elements in order to control secondary voltage between neutral and earth.

4. The device according to claim 3 wherein the control unit is configured to select the phases to be connected to the at least two controllable reactance elements which in turn are connected between neutral and earth.

5. The device according to claim 3, wherein the control unit is configured to control a size of the reactance elements until the condition for a complete compensation of an earth fault current is fulfilled.

6. The device according to claim 1 wherein the device is configured to work in parallel with a Petersen coil in order to compensate for a residual fault current not compensated by the Petersen coil itself.

7. A method of producing a neutral voltage in an AC network with a power transformer, wherein a device comprising at least two controllable reactance elements each connected with one side to two different voltages of a three phase voltage source which is synchronous with the power network, and that the at least two controllable reactance elements with their other side are jointly connected to a neutral of the power network, wherein the at least two controllable reactance elements are individually controllable from a control unit configured to control the neutral voltage of the power transformer with respect to amplitude and phase in relation to the power transformer's own voltage system, wherein the at least two controllable reactance elements are made up of two tuneable capacitor banks, and wherein the method comprises the step of individually controlling the at least two controllable reactance elements in order to control the neutral voltage to eliminate a drive voltage of an earth fault current.

8. The method according to claim 7, wherein the at least two controllable reactance elements comprise three reactance elements, one in each phase of the voltage source.

9. The method according to claim 7, wherein the method is used to compensate an earth fault current.

10. The method according to claim 7, wherein the method is used for parallel operation with a Petersen coil in order to compensate a residual earth fault current which is not compensated by the Petersen coil itself.

* * * * *